United States Patent
Oki

(10) Patent No.: US 9,557,501 B2
(45) Date of Patent: Jan. 31, 2017

(54) OPTICAL TRANSCEIVER HAVING GASKET SUPPORTED BY MEMBER WITHOUT NARROWING INNER SPACE OF HOUSING

(71) Applicant: Sumitomo Electric Industries, Ltd., Osaka-shi (JP)

(72) Inventor: Kazushige Oki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/066,916

(22) Filed: Mar. 10, 2016

(65) Prior Publication Data
US 2016/0266336 A1 Sep. 15, 2016

(30) Foreign Application Priority Data

Mar. 12, 2015 (JP) ................. 2015-049508

(51) Int. Cl.
*G02B 6/12* (2006.01)
*G02B 6/42* (2006.01)
*H04B 10/40* (2013.01)
*G02B 6/38* (2006.01)

(52) U.S. Cl.
CPC ........... *G02B 6/4257* (2013.01); *G02B 6/3817* (2013.01); *G02B 6/3894* (2013.01); *G02B 6/424* (2013.01); *G02B 6/4274* (2013.01); *H04B 10/40* (2013.01)

(58) Field of Classification Search
CPC ....... G02B 6/43; G02B 6/4214; G02B 6/3894; G02B 6/3817; G02B 6/4274; G02B 6/424
See application file for complete search history.

(56) References Cited

U.S. PATENT DOCUMENTS

| 6,860,641 | B1 * | 3/2005 | Goldenburg ......... G02B 6/4453 385/53 |
| 8,628,256 | B2 | 1/2014 | Oki et al. |
| 8,913,388 | B2 * | 12/2014 | Teo ...................... G02B 6/4266 361/704 |

FOREIGN PATENT DOCUMENTS

JP          2001-111283 A      4/2001

\* cited by examiner

*Primary Examiner* — Jennifer Doan
(74) *Attorney, Agent, or Firm* — Venable LLP; Michael A. Sartori

(57) ABSTRACT

An optical transceiver of the CFP type having a gasket set within the slot is disclosed. The optical transceiver provides the slots in respective sides of the housing to pass the screws therein for fastening the optical transceiver to an electrical plug prepared in the host system. A support is also set within the slot so as to extend along the outer wall of the slot and not to interfere with the screw. The support pushes the gasket against the outer wall so as to cover a gap inherently formed between the top housing and the bottom housing.

11 Claims, 14 Drawing Sheets

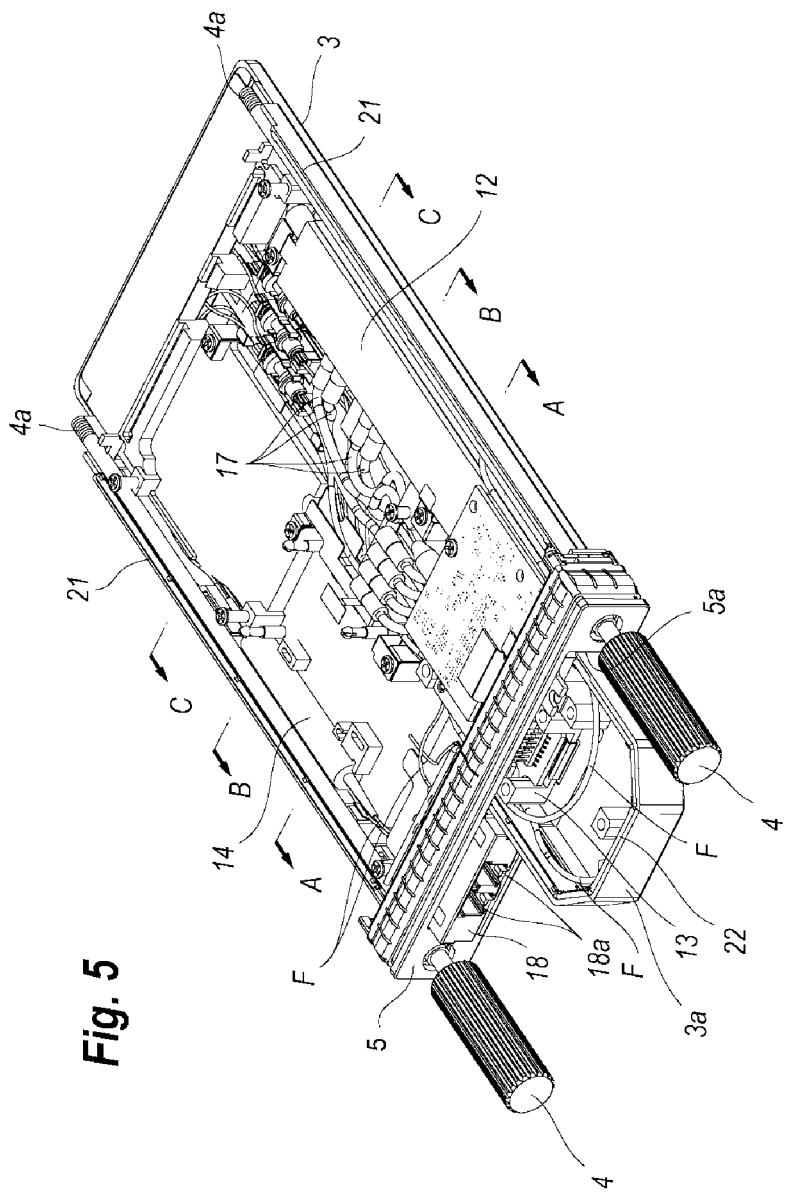

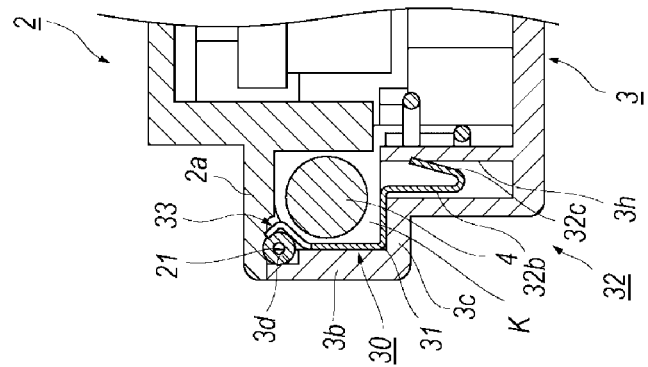
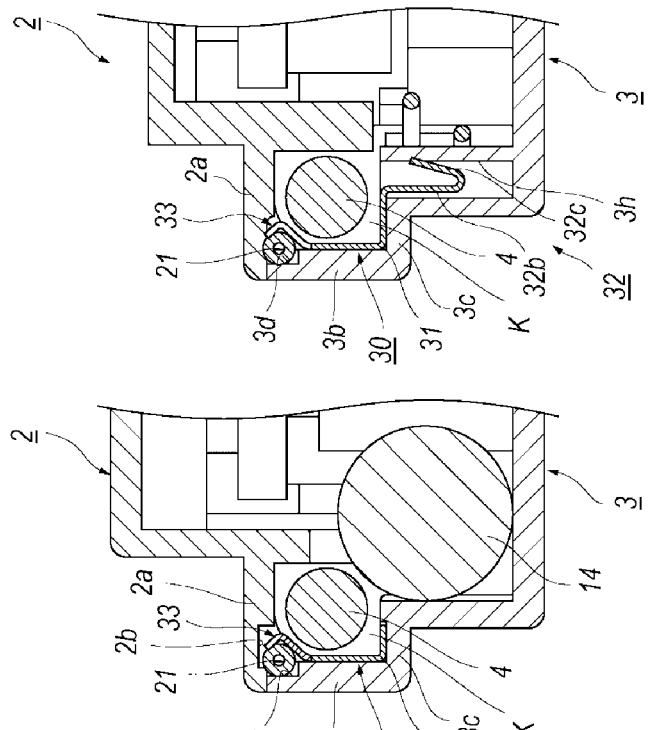
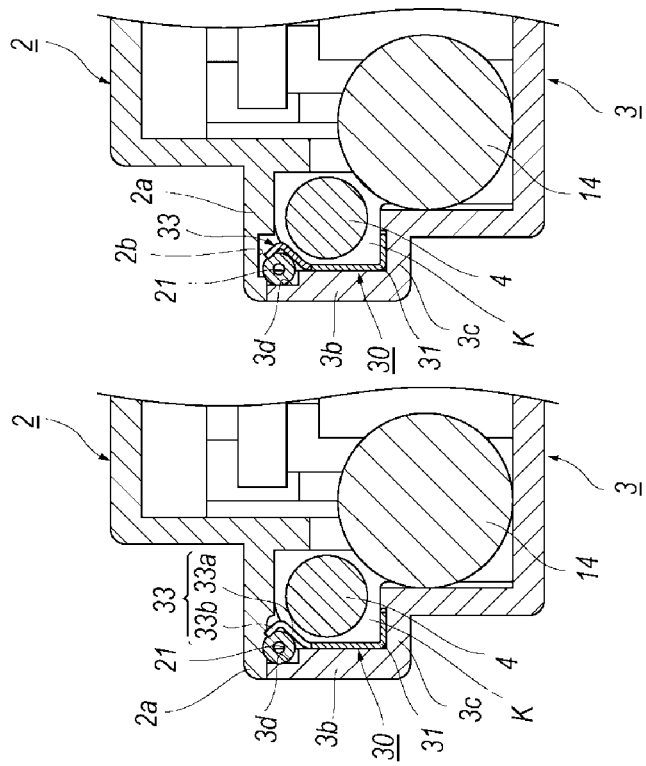

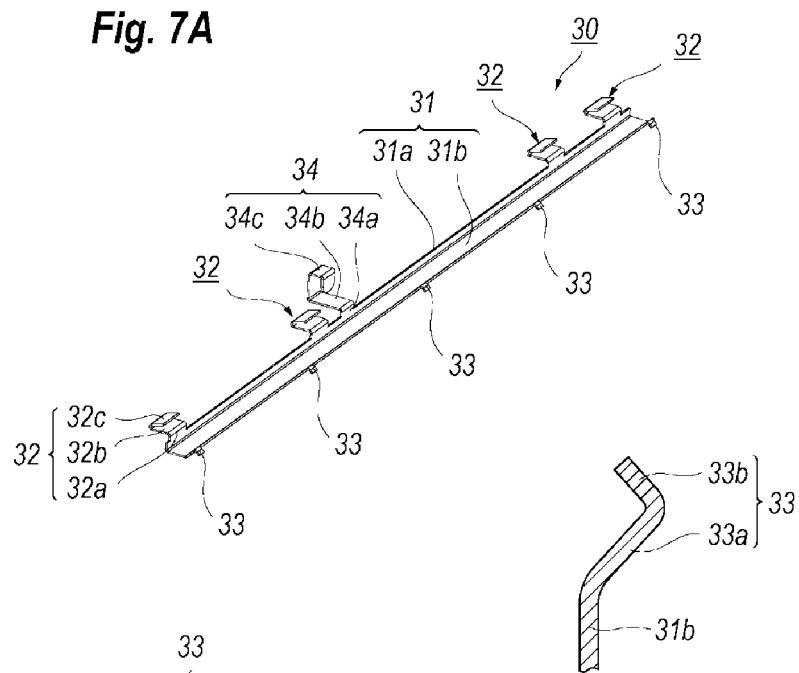
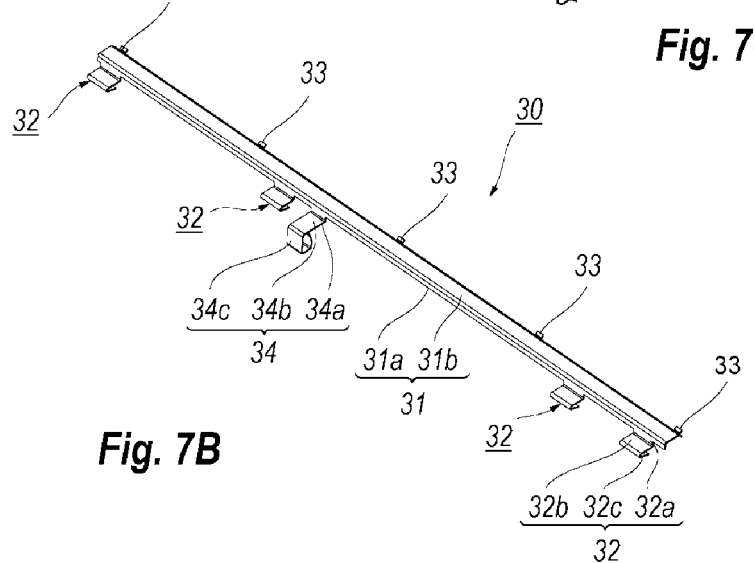

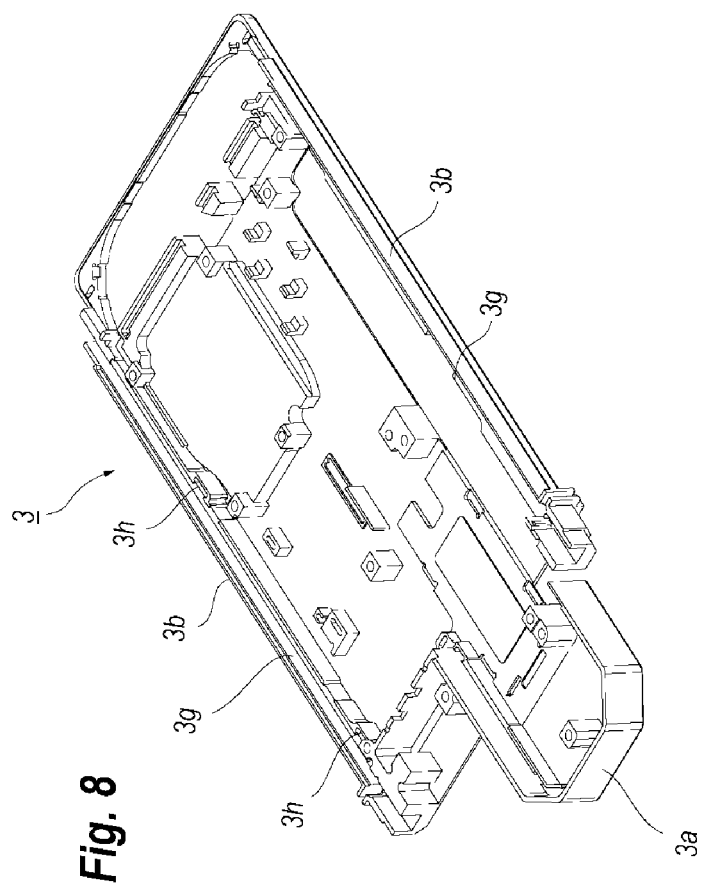

OPTICAL TRANSCEIVER HAVING GASKET SUPPORTED BY MEMBER WITHOUT NARROWING INNER SPACE OF HOUSING

BACKGROUND OF THE INVENTION

1. Field of the Invention

The present application relates to an optical transceiver, in particular, the present application relates to an arrangement to set a gasket without narrowing an inner space of the housing following the CFP (Centum Form factor Pluggable) standard.

2. Background Arts

A Japanese patent application laid open No. 2001-111283A has disclosed an electronic apparatus having a circuit board and two shield cases sandwiching the circuit board as applying electrically conductive resin therebetween. The electrically conductive resin with a liquid shape is first applied to a surface of one of the shield cases, then, the other shield case is pressed against the shield case so as to crush the electrically conductive resin. An optical transceiver providing an electrically conductive and elastic gasket for shielding a housing has disclosed in, for instance, the U.S. Pat. No. 8,628,256B.

The electrically conductive resin in a liquid shape or a pasted shape has an advantage in a point to restrict reduction of an inner space for installing optical and/or electrical components. However, such electrically conductive resin is necessary to prepare specific tools or apparatus to apply to practical devices. An apparatus for applying the resin, positioning the device to be applied with the resin, and/or hardening the applied resin, and so on becomes necessary for the production of the apparatus implementing such resin. Also, such resin requests additional time for hardening. The elastic gasket does not request special tools and additional times, but inevitably prepares an arrangement or a structure to set the gasket therein, which narrows a space for installing electrical and optical components within the optical transceiver.

SUMMARY OF THE INVENTION

An aspect of the present application relates to an optical transceiver that comprises a top housing, a bottom housing, inner fibers, an electrically conductive gasket and a support. The top and bottom housings form an inner space for installing optical and electrical components therein. The top housing provides a ceiling; while, the bottom housing provides a sides wall. The ceiling is in contact to a top of the side wall of the bottom housing. The inner fibers optically couple the optical components installed within the inner space. The electrically conductive gasket covers a gap formed between the ceiling of the top housing and the top of the side wall of the bottom housing. The support pushes the electrically conductive gasket against the ceiling of the top housing and the side wall of the bottom housing. The support may have a base, inserts, and hooks. The base extends along the electrically conductive gasket. The inserts and the hooks extend from the base toward respective directions opposite to each other. The inserts are set within pockets formed in the bottom housing. The hooks push the electrically conductive gasket against the ceiling of the top housing and the side wall of the bottom housing.

The optical transceiver of the present invention may further comprise a screw that fastens the optical transceiver to a host system. The screw is set in a slot formed by the ceiling of the top housing and the side wall of the bottom housing. The electrically conductive gasket and the support may be set in the slot. In the optical transceiver of the present invention, the bottom housing may further include a bottom wall. The ceiling of the top housing and the side wall and the bottom wall of the bottom housing may form the slot. The support may further have guides for securing the inner fiber therein. The side wall of the bottom housing may provide a step in the top thereof. The step secures the electrically conductive gasket thereon as sandwiching with the ceiling of the top housing and the support. The ceiling of the top housing may provide a hollow that forms a space cooperating with the step of the side wall and the support. The electrically conductive resin is set within the step.

BRIEF DESCRIPTION OF THE DRAWINGS

The foregoing and other purposes, aspects and advantages will be better understood from the following detailed description of a preferred embodiment of the invention with reference to the drawings, in which:

FIG. 1 is viewed from a top of the optical transceiver;

FIG. 2 is viewed from a bottom of the optical transceiver;

FIG. 5 shows the inside of the optical transceiver by removing the top housing and a circuit board;

FIGS. 6A to 6C show cross sections of a slot of the optical transceiver taken along the lines A-A, B-B, and C-C, respectively, indicated in FIG. 5;

FIGS. 7A and 7B are perspective views of the support, and FIG. 7C shows a cross section of a hook of the support;

FIG. 8 is a perspective view of the inside of the bottom housing;

DESCRIPTION OF EMBODIMENTS

Next, some embodiment of an optical transceiver according to the present application will be described as referring to drawings. In the description of the drawings, numerals or symbols same with or similar to each other will refer to elements same with or similar to each other without duplicated explanations.

Figure 1:
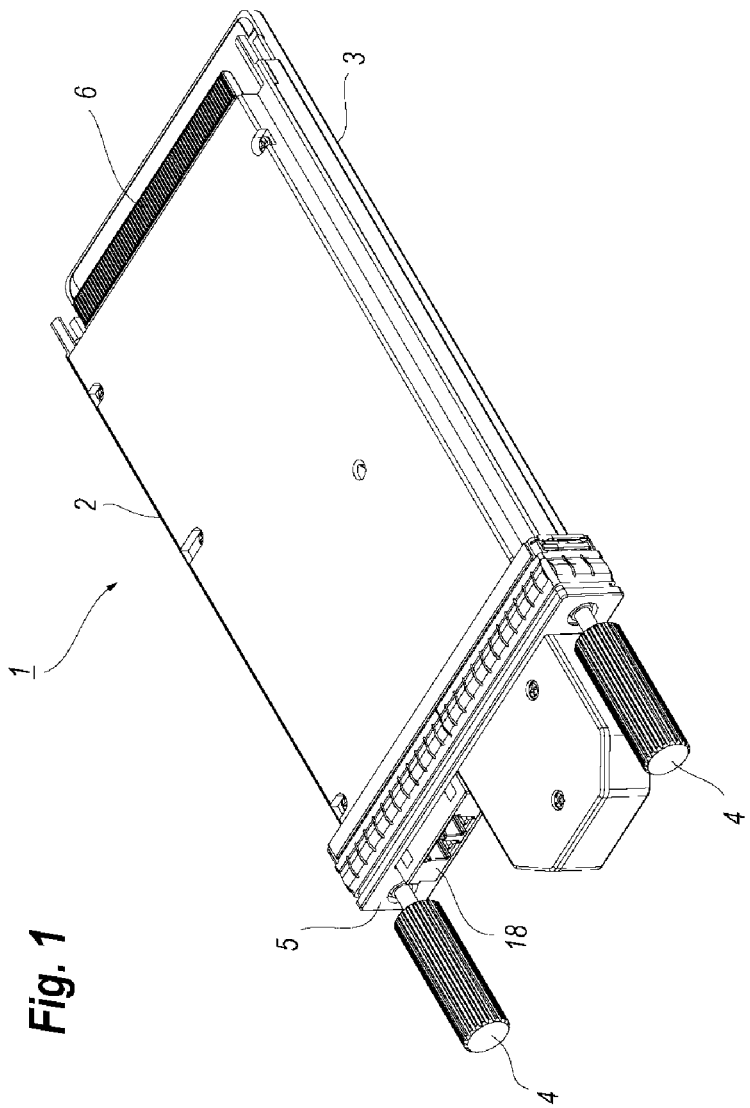
FIG. 1 shows an outer appearance of an optical transceiver according to an embodiment of the present application, where
Figure 2:
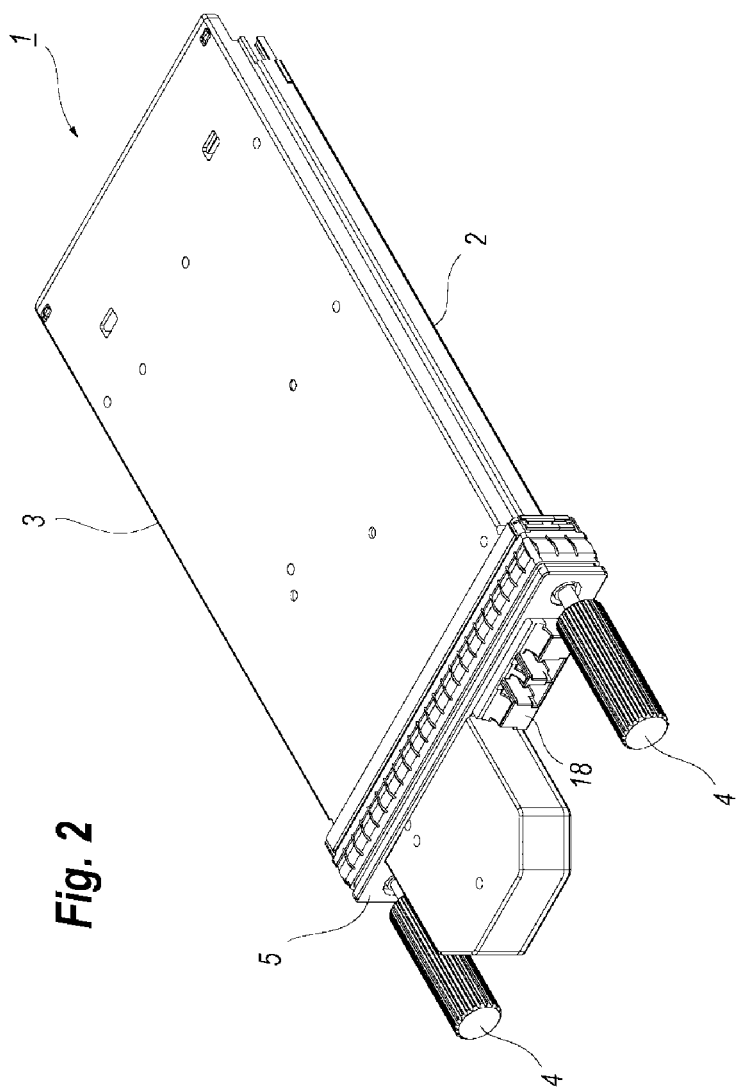
FIG. 2 shows an outer appearance of the optical transceiver shown in FIG. 1, where

FIG. 1 shows an outer appearance of an optical transceiver according to an embodiment of the present application, where FIG. 1 is viewed from a top of the optical transceiver; FIG. 2 shows an outer appearance of the optical transceiver shown in FIG. 1, where FIG. 2 is viewed from a bottom of the optical transceiver. The optical transceiver 1 of the present embodiment, which follows a CFP (Centum Form factor Pluggable) standard, which is one of multi-source agreements defined in the field of the optical transceiver, primarily includes a top housing 2, a bottom housing 3, two fastening screws 4, and a front panel 5. The top and bottom housings, 2 and 3, are made of metal and form an inside into which optical components and electrical components are implemented.

The top and bottom housings, 2 and 3, which have rectangular shapes, may be made of metal die-casting with dimensions of about 15 cm in a longitudinal direction, about 8 cm in a lateral direction, and about 1.5 cm in a thickness thereof. The specification below assumes directions of "front" and "rear" along the longitudinal direction, while, "sides" along the lateral direction. Moreover, the front is the side where the optical receptacle 18 is provided, and the rear is the side the electrical plug 6 is provided. However, these directions and sides do not affect the scope of the present invention. Two fastening screws 4, which extend longitudinally in respective sides of the housings, 2 and 3, may fasten the optical transceiver 1 to a host system with which the optical transceiver 1 communicates. Front ends of the screws 4 protrude from the front end of the optical transceiver 1.

Figure 3:
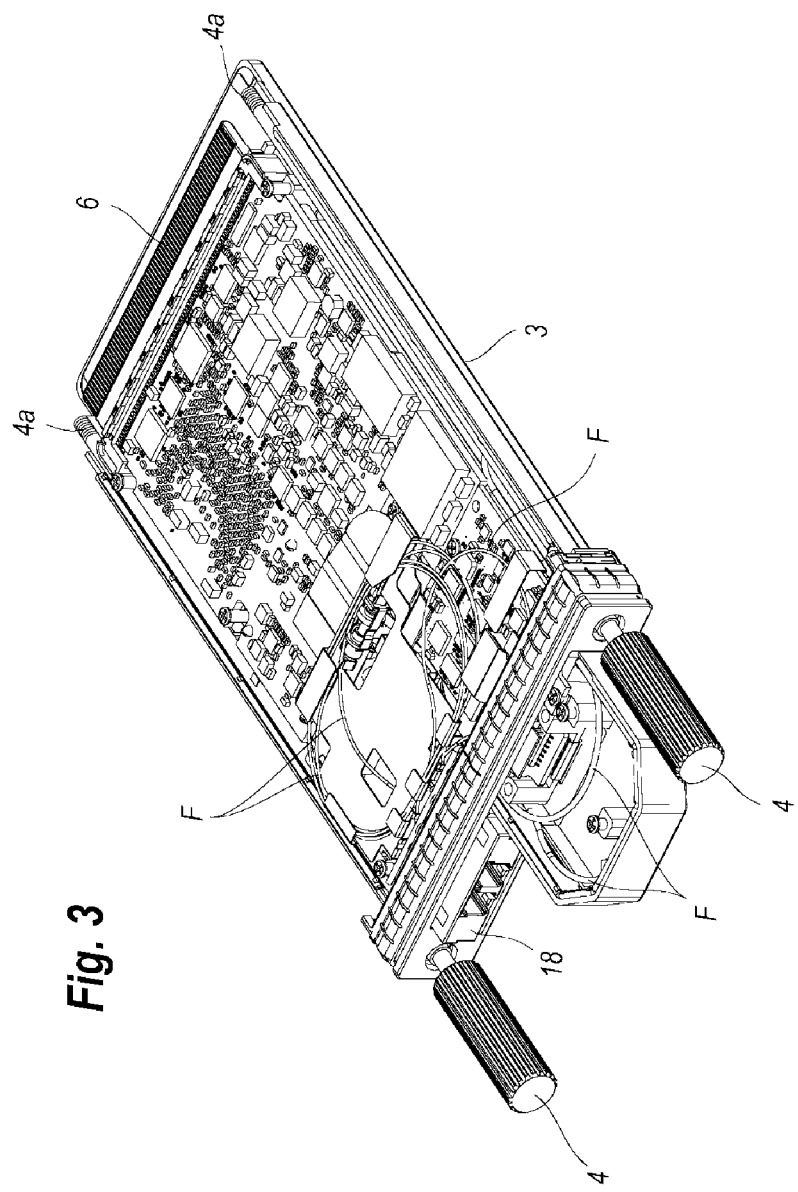
FIG. 3 shows an inside of the optical transceiver viewed from the top thereof by removing a top housing.

FIG. 3 shows an inside of the optical transceiver viewed from the top thereof by removing a top housing 2 thereof. As shown in FIG. 3, the fastening screws 4 pierce the sides of the bottom housing 3 such that rear ends 4a of the fastening screws 4 protrude rearward in the sides of the electrical plug 6. The electrical plug 6 includes a total of 148 terminals with a pitch between nearest terminals is 0.8 mm, where the terminals includes those transmitting radio frequency (RF) signals and those for transmitting low frequency (LF) signals and/or direct current (DC) signals. Fastening the fastening screws 4 to an electrical connector prepared in the host system, the optical transceiver 1 is electrically connected to the host system.

Figure 4:
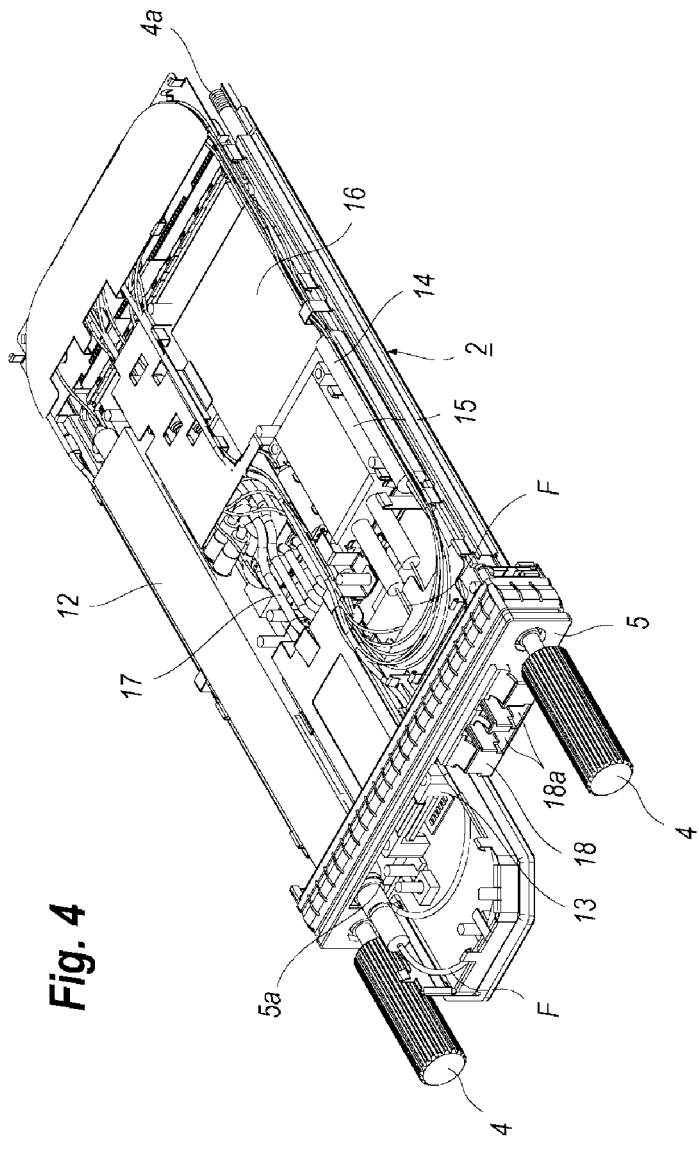
FIG. 4 shows the inside of the optical transceiver viewed from the bottom by removing a bottom housing thereof.

FIG. 4 shows the inside of the optical transceiver viewed from the bottom thereof by removing a bottom housing 3 thereof; and FIG. 5 shows the inside of the optical transceiver by removing the top housing 2 and a circuit board. The top and bottom housings, 2 and 3, form an inner space where optical components including an optical modulator 12, a wavelength tunable laser diode (hereafter denoted as t-LD) 13, a polarization maintaining couple (hereafter denoted as PMC) 14, an integrated coherent receiver (hereafter denoted as ICR) 15, an optical receptacle 18; and electrical components including a digital signal processor (hereafter denoted as DSP) 16 and semi-rigid cables 17. The inner space also encloses inner fibers F optically coupling those optical components of the optical modulator 12, the t-LD 13, the PMC 14, the ICR 15, and the optical receptacle 18.

Specifically, the optical transceiver 1 disposes the optical modulator 12 longitudinally in the inner space along one of sides. The optical modulator 12 is electrically driven by a driver through four semi-rigid cables 17; while, receives a continuous wave (CW) beam from the t-LD 13 through the PMC 14 and the inner fiber F, and outputs a modulated beam to the optical receptacle 18 thorough another inner fiber F. The modulated beam is externally output from the optical receptacle 18.

The front panel 5 exposes the optical receptacle 18. That is, two optical ports 18a are exposed frontward in the front panel 5. Receiving an external optical connector by the ports 18a, the optical transceiver 1 may perform the full-duplex optical communication. The optical receptacle 18 is optically coupled through the inner fibers F, which round within the inner space of the housing, with the optical modulator 12 as described above and the ICR 15. An optical signal provided from the external optical fiber set in the optical receptacle 18 is thus provided to the ICR 15 through the inner fiber F.

The t-LD 13, which implements a semiconductor laser diode (LD) whose emission wavelength is tunable by biases supplied to the LD, generates a CW beam provided to the optical modulator 12 as an optical source and the ICR 15 as a local beam to be interfered with a signal beam provided from the external fiber. The optical transceiver 1 disposes the t-LD 13 in a front of the inner space, where a portion of the t-LD 13 protrudes into the auxiliary space 3a passing the front panel 5; the PMC 14 longitudinally along the side opposite to that facing the optical modulator 12; and the DSP 16 in a rear of the ICR 15.

Next, a function and an arrangement to shield the inner space of the optical transceiver 1 will be described. A conventional optical transceiver following the CFP standard has been used to apply electrically conducive resin in peripheries of the inner space because the optical transceiver of the CFP standard is necessary to implement the fastening screws 4 in the respective sides thereof, which strongly restricts the inner space, or provides substantially no room for additional mechanisms to shield the inner space. However, such electrically conductive resin requires special tools to apply in the housing and takes time to be solidified.

The optical transceiver 1 of the present embodiment, instead of the electrically conductive resin above described, implements a tubed gasket and provides arrangements to set the tubed gasket therein without narrowing the inner space of the housing for installing the optical components and the electrical components. Specifically, the optical transceiver 1 implements two gaskets 21 extending longitudinally in outer sides of the respective fastening screws 4 and another tubed gasket 22 arranged in the auxiliary space 3a of the bottom housing 3 protruding from a port 5a of the front panel 5. The gaskets, 21 and 22, may be made of electrically conductive and elastic material, such as rubber coated with electrically conductive resin. The auxiliary space 3a may provide an additional space to install some optical components and some electrical components. The optical transceiver 1 of the embodiment installs a portion of the t-LD 13 and some of inner fibers F therein. Those tubed gaskets, 21 and 22, which are made of electrically conductive material, are set along interfaces between the top housing 2 and the bottom housing 3 such that the tubed gaskets, 21 and 22, fill the gap formed between two housings, 21 and 22, and are in contact to the top and bottom housings, 2 and 3.

Accordingly, the tubed gaskets, 21 and 22, may effectively and electrically shield the inner space of the housing. The gasket 22 is arranged along the outer shape of the auxiliary space 3a.

FIGS. 6A to 6C show cross sections of a slot K of the optical transceiver taken along the lines A-A, B-B, and C-C, respectively, each indicated in FIG. 5. As shown in FIGS. 6A to 6C, the bottom housing 3 provides a side wall 3b and a bottom wall 3c extending inward from the bottom of the side wall 3b. The top housing 2 provides a ceiling 2a extending inward from the side wall 3b of the bottom housing 3. The side wall 3b, the bottom wall 3c and the ceiling 2a may form the slot K for passing the fastening screw 4 therethrough. The side wall 3b may be in contact to the ceiling 2a; or a gap or a slit may be formed between the side wall 3b and the ceiling 2a. The gasket 21 is in contact to both of the side wall 3b of the bottom housing 3 and the ceiling 2a of the top housing 2. In a modified arrangement, the side wall 3b may provide a step 3d in a top thereof, and the step 3d may receive the gasket 21 therein. Also, the ceiling 2a may provide a hollow 2b in a portion corresponding to the step 3d of the side wall 3b. The step 3d and the hollow 2b may form a pocket 3h in which the gasket 21 is set.

Arranged within the slot K is a support 30 for abutting the gasket 21 against the ceiling 2a and the side wall 3b. The support 30, which may be formed by a metal plate of stainless steel, extends along the side wall 3b and the bottom wall 3c and has a hook 33 in a top end thereof for forming, accompanied with the step 3d in the side wall 3b and the hollow 2b in the ceiling 2a, a space into which the gasket 21 is set. The PMC 14 is arranges so as to close the slot K. Because the support 30 is arranged in the slot K with the fastening screw 4, the support 30, or the arrangement for setting the gasket 21, does not restrict the inner space of the housing.

FIGS. 7A and 7B are perspective views of the support 30, and FIG. 7C shows a cross section of a hook 33 of the support 30. As shown in FIGS. 6A to 7B, the support 30 is an elongated member arranged in the slot K along the side wall 3b. The support 30 provides a base 31 with an elongated shape and some inserts 32 engaged with the bottom housing 3, hooks 33 for supporting the gasket 21, and a guide 34 for guiding the inner fibers F.

The base 31 has an L-shaped cross section formed by a lateral bar 31a extending along the bottom wall 3c and a vertical bar 31b extending along the side wall 3b. The inserts 32, which are arranged with distances therebetween, extend downward from the lateral bar 31a of the base 31. The insert 32 comprises a lateral tab 32a extending from the lateral bar 31a, a leg 32b bent downward at an end of the lateral tab 32a, and a turn-up 32c bent upward at an end of the leg 32b. The leg 32b and the turn-up 32c form a U-shaped cross section. The hooks 33 extend from an end of the vertical bar 31b of the base 31. Referring to FIG. 7C, the hook 33 provides a first portion 33a bent inward at the end of the vertical bar 31b of the base 31, and a second portion 33b bent outward at an end of the first portion 33a. The first portion 33a and the second portion 33b form the space for securing the gasket 21 therein. The guide 34 includes a lateral tab 34a extending from the lateral bar 31a of the base 31, a leg 34b bent downward at an end of the lateral tab 34a of the guide 34, and a pocket 34c formed in an end of the leg 34b with a rectangular cross section, where the inner fibers F are secured within the rectangular space of the pocket 34c.

Figure 9A:
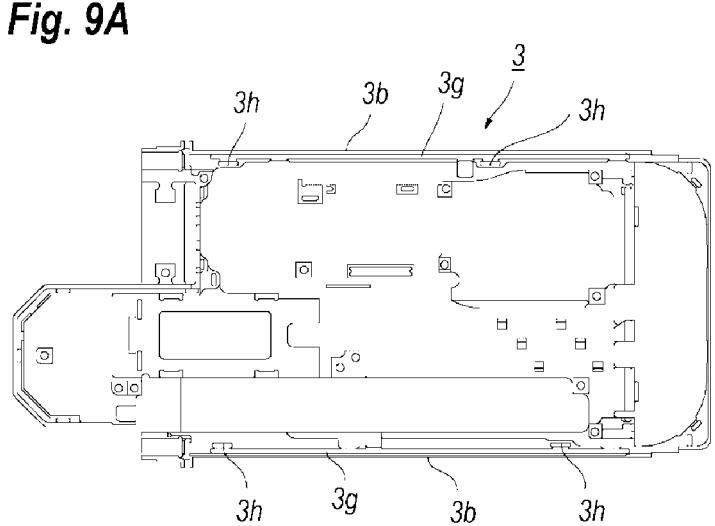
FIG. 9A is a plan view of the inside of the bottom housing, and FIG. 9B magnifies a side of the bottom housing that receives inserts of the support therein.
Figure 9B:
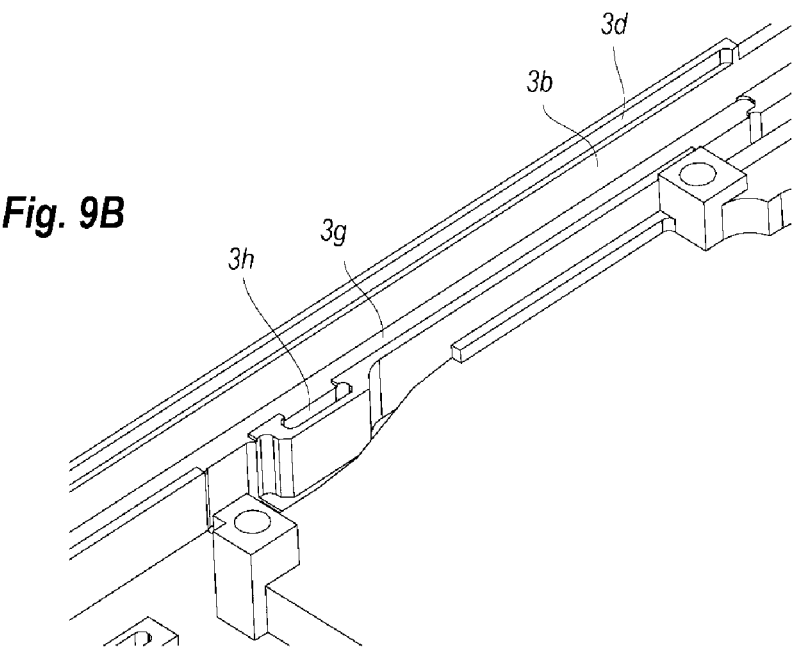

Next, an arrangement of the bottom housing 3 for setting the support 30 thereon will be described. FIG. 8 is a perspective view of the inside of the bottom housing 3; FIG. 9A is a plan view of the inside of the bottom housing 3, and FIG. 9B magnifies a side of the bottom housing 3 that receives inserts 32 of the support 30 therein. The bottom housing 3 provides grooves 3g in respective sides thereof, where the grooves 3g, which form the slot K passing the fastening screws 4, set the support 30 therein. The groove 3g each arranges two pockets 3h in inner side of a front portion and a rear portion thereof, where the pockets 3h receive the inserts 32 of the support 30.

Figure 10A:
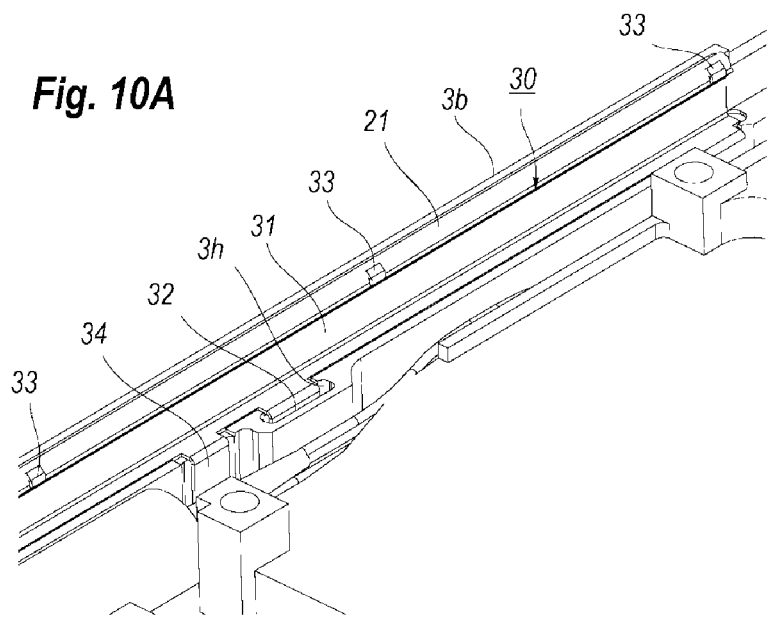
FIG. 10A magnifies the side of the bottom housing that sets the support and the gasket therein, and FIG. 10B magnifies the side that additionally sets inner fibers.
Figure 10B:
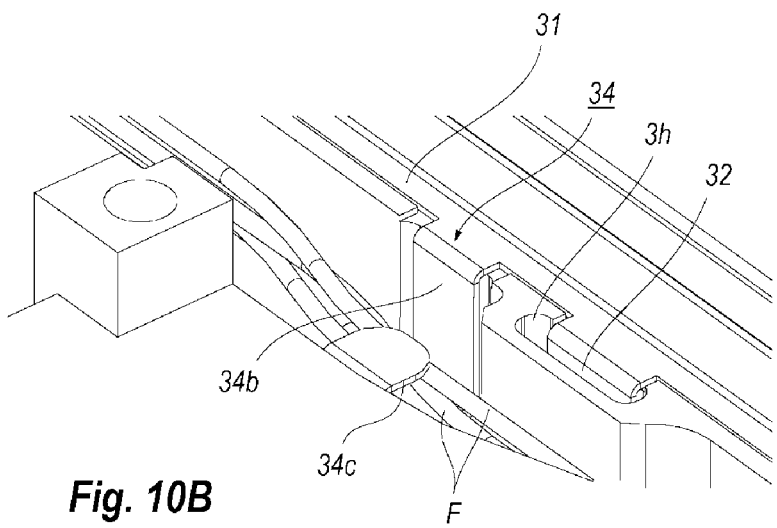
Figure 11:
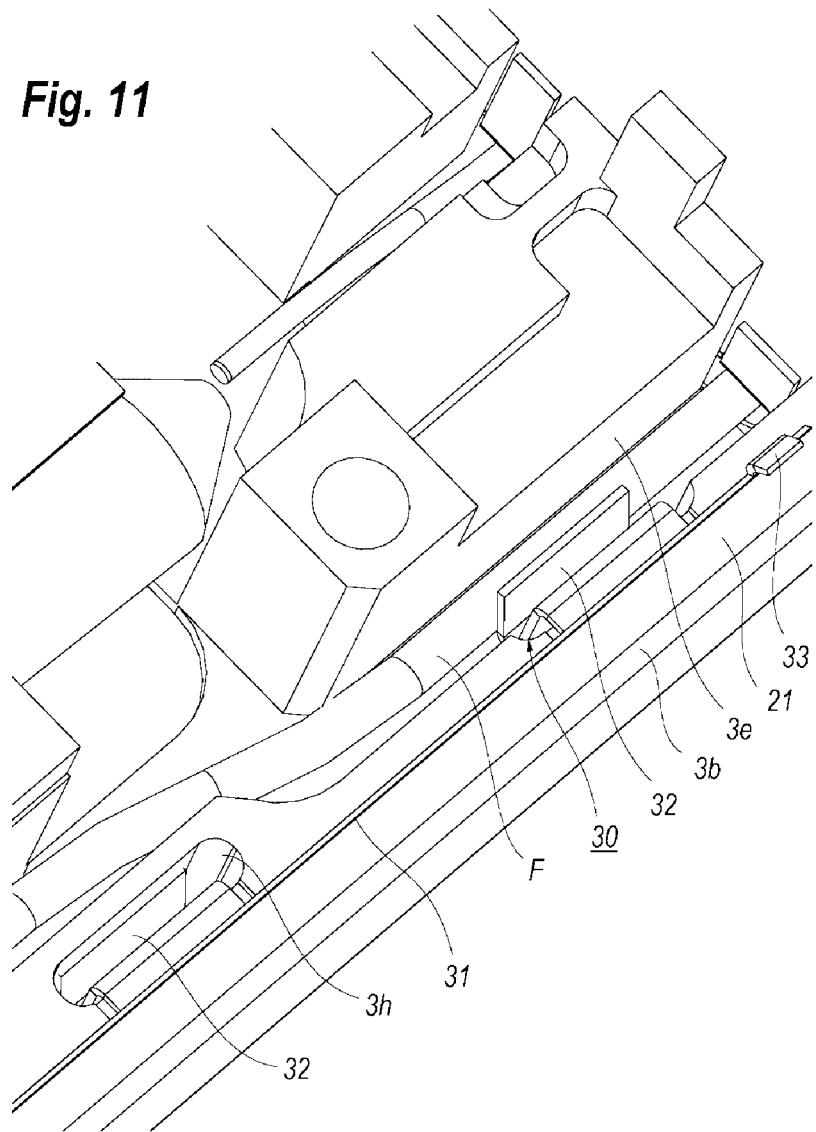
FIG. 11 magnifies the support set within the side of the bottom housing.

FIG. 10A magnifies the side of the bottom housing 3 that sets the support 30 and the gasket 21 therein, and FIG. 10B magnifies the side that additionally sets inner fibers F therein; and FIG. 11 magnifies the support 30 set within the side of the bottom housing 3. As shown in FIG. 10A and 11, the support 30 in the base 31 thereof is set within the groove 3g and along the side wall 3b; and the insert 32 in the leg 32b and the turn-up 32c thereof, which makes a V-shaped cross section, is inserted into the pocket 3h. The hook 33 pushes the gasket 21 set in the space formed by the first portion 33a and the second portion 33b thereof against the side wall 3b and the ceiling 2a so as to cover a gap formed between the side wall 3b and the ceiling 2a. As shown in FIG. 10B, the guide 34 in the leg 34b thereof extends downward from the end of the lateral tab 34a and provides the pocket 34c in the end of the leg 34b. The pocket 34c receives the inner fibers F therein. Because the pocket 34c provides a ceiling tab, the inner fibers F once set in the rectangular space of the pocket 34c do not scamp out from the rectangular space.

Some of inserts 32 is not set within the pocket 3h, and the inner fibers F pass between the inserts 32 out of the pocket 3h and the inner wall 3e. That is, the insert 32 not set within the pocket 3h guides the inner fiber F, and shows a function to prevent the inner fiber F from being disarranged.

Figure 12A:
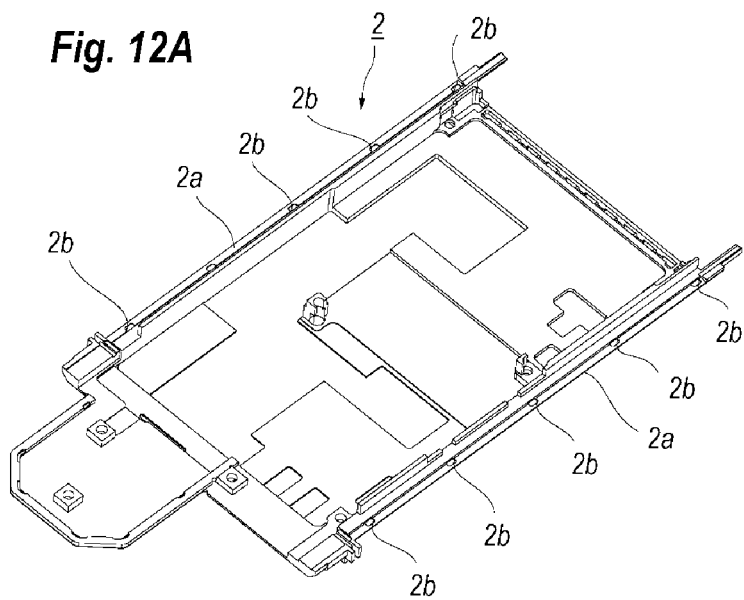
FIG. 12A shows an inside of the top housing, and FIG. 12B magnifies a ceiling of the top housing that receives the support therein.
Figure 12B:
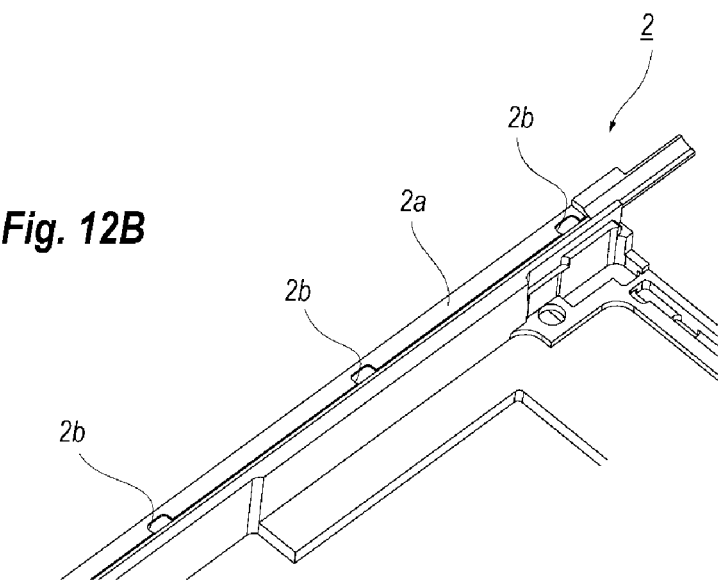
Figure 13A:
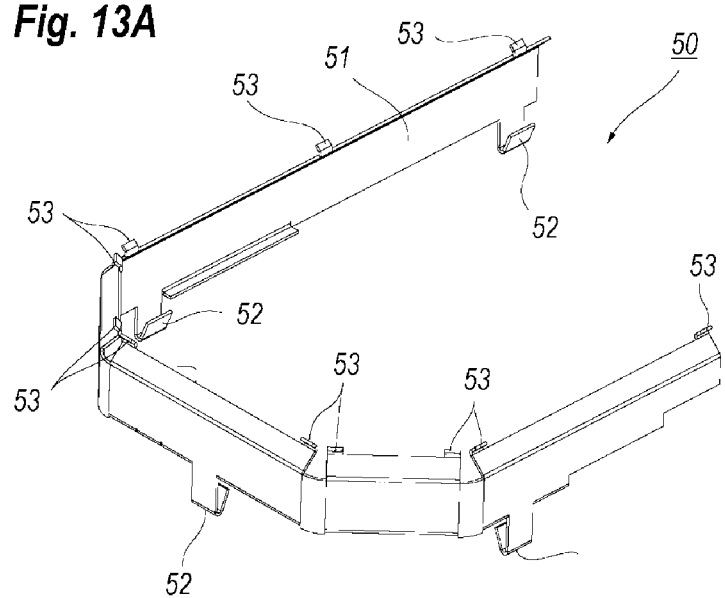
FIGS. 13A and 13B are perspective views of another support set in an auxiliary space of the bottom housing.
Figure 13B:
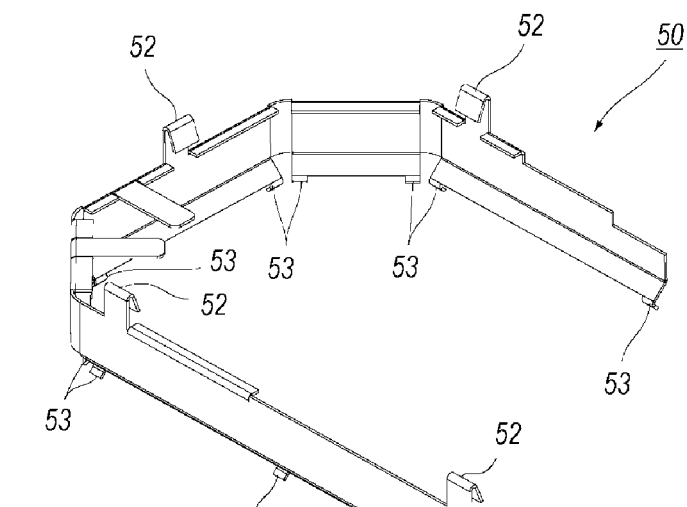
Figure 14A:
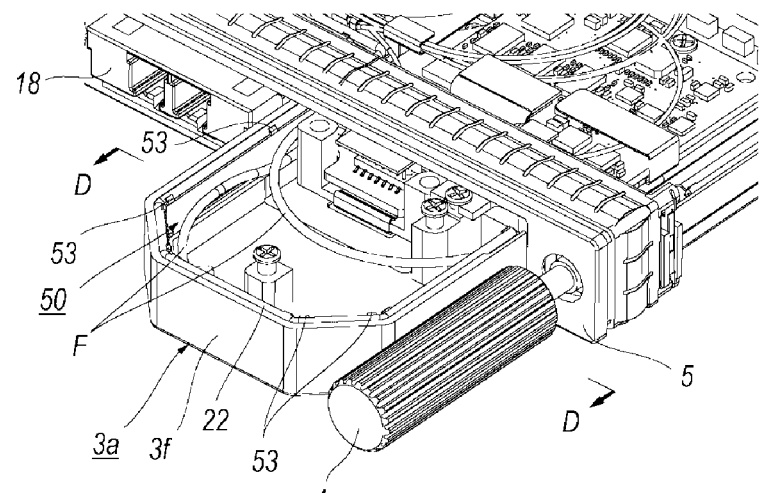
FIG. 14A shows the auxiliary space that sets the other support therein.
Figure 14B:
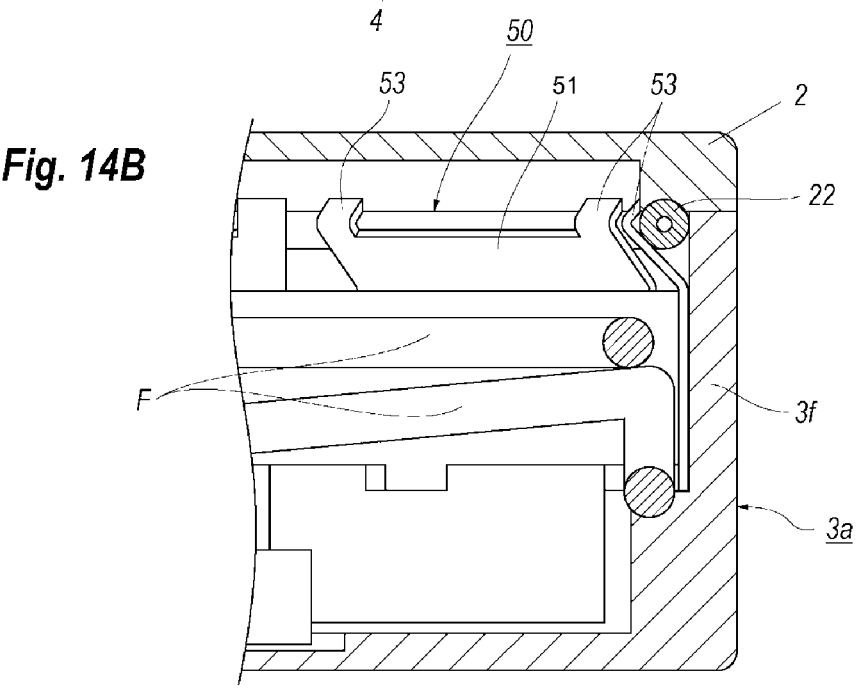
FIG. 14B shows a cross section taken along the line D-D indicated in FIG. 14A.

FIG. 12A shows an inside of the top housing 2 in upside down, and FIG. 12B magnifies the ceiling 2a of the top housing 2 that forms the slot K to set the support 30 therein. The ceiling 2a provides the hollows 2b that receive the ends of the hook 33 of the support 30. FIGS. 13A and 13B are perspective views of another support 50 set in an auxiliary space 3a of the bottom housing 3; FIG. 14A shows the auxiliary space 3a that sets the other support 50 therein, and FIG. 14B shows a cross section taken along the line D-D indicated in FIG. 14A. Referring to FIGS. 13A and 13B, the support 50, similar to aforementioned support 30, provides the base 51 following the outer shape of the auxiliary space 3a, some inserts 52 set within the pockets 3h of the bottom housing 3, and hooks 53 that support the gasket 22. The support 50 may be made of stainless steel.

The inserts 52 and the hooks 53 extend from the base 51 toward respective directions opposite to each other. The shapes and the functions of the inserts 52 and the hooks 53 are same as those of the aforementioned base 31. As shown in FIGS. 14A and 14B, the support 50 is arranged along the outer shape of the auxiliary space 3a as inserting the inserts 52 into the hollows 3h prepared in the auxiliary space 3a. The hooks 53 push the gasket 22 against the top housing 2 and the front wall 3f of the auxiliary space 3a so as to cover a gap between the housings, 2 and 3. Thus, the gasket 22 may effectively shield the auxiliary space 3a.

A conventional optical transceiver following the standard of the CFP transceiver usually arranges inner of the slot K, which resultantly restricts the inner space of the housing for enclosing the optical and electrical components. When an optical transceiver sets the gasket 21 in the slot K, electrically conductive resin of a liquid shape, or a paste, is used to be applied because the standard of the CFP transceiver strictly defines the position of the screw 4 in the slot K. The optical transceiver 1 of the present embodiment sets the gasket 21 outside of the screw 4 in the slot K as being supported by the support 30, which does not restrict the inner space of the housing for enclosing the optical and electrical components. Moreover, the supports, 30 and 50, are set only as inserting the inserts, 32 and 52, thereof into respective pockets 3h of the bottom housing 3 without screws 4, adhesive, and so on.

Although the present invention has been fully described in conjunction with the preferred embodiment thereof with reference to the accompanying drawings, it is to be understood that various changes and modifications may be apparent to those skilled in the art. For instance, the number, the position, and the shape of the insert 32 and that of the hook 33 may be optional. Also, although the supports, 30 and 50, of the embodiment are made of stainless steel, the support, 30 or 50, are not restricted to be made of metal.

A support made of plastic may be applicable to the optical transceiver. Such changes and modifications are to be understood as included within the scope of the present invention as defined by the appended claims, unless they depart therefrom.

I claim:

1. An optical transceiver, comprising:
    a top housing and a bottom housing forming an inner space that installs optical components and electrical components therein, the top housing providing a ceiling and the bottom providing a side wall, the ceiling of the top housing being in contact to a top of the side wall of the bottom housing;
    an electrically conductive gasket that covers a gap formed between the ceiling of the top housing and the side wall of the bottom housing; and
    a support that pushes the electrically conductive gasket against the ceiling of the top housing and the side wall of the bottom housing.

2. The optical transceiver of claim 1,
    wherein the support provides a base, inserts, and hooks, the base extending along the electrically conductive gasket, the inserts and the hooks extending from the base toward respective directions opposite to each other, the inserts being set within pockets provided in the bottom housing, the hooks pushing the electrically conductive gasket against the ceiling of the top housing and the side wall of the bottom housing.

3. The optical transceiver of claim 1,
    wherein the optical transceiver further comprises a screw that fastens the optical transceiver to a host system, the screw being set in a slot formed by the ceiling of the top housing and the side wall of the bottom housing,
    wherein the electrically conductive gasket and the support are set in the slot.

4. The optical transceiver of claim 3,
    wherein the bottom housing further includes a bottom wall, and
    wherein the ceiling of the top housing, and the side wall and the bottom wall of the bottom housing form the slot.

5. The optical transceiver of claim 1,
    further including an inner fibers that optically couple the optical components installed within the inner space,
    wherein the support further provides guides that secures the inner fibers therein.

6. The optical transceiver of claim 1,
    wherein the side wall of the bottom housing provides a step in the top thereof, the step securing the electrically conductive gasket thereon as sandwiching with the ceiling of the top housing and the support.

7. The optical transceiver of claim 6,
    wherein the ceiling of the top housing provides a hollow, and
    wherein the hollow of the ceiling, the step of the side wall, and the support form a space where the electrically conductive gasket is set therein.

8. The optical transceiver of claim 1,
    wherein the support is made of metal.

9. The optical transceiver of claim 1,
    wherein the support is made of plastic.

10. The optical transceiver of claim 1,
    wherein the top housing and the bottom housing form a housing following a standard of a centum form factor pluggable (CFP) transceiver.

11. The optical transceiver of claim 1,
    wherein the bottom housing provides an auxiliary space protruding from a front panel of the housing, the auxiliary space installing optical components and electrically components and being shielded by an other electrically conductive gasket secured by an other support set along an outer wall of the auxiliary space.

* * * * *